United States Patent
Liu et al.

(10) Patent No.: US 6,829,115 B2
(45) Date of Patent: Dec. 7, 2004

(54) METHOD AND APPARATUS FOR MEASURING HALF FREQUENCY WHIRL IN A SPINDLE MOTOR

(75) Inventors: Xiong Liu, Singapore (SG); ChoonKiat Lim, Singapore (SG); YongJie Tang, Singapore (SG); Pow-Hing Yong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 362 days.

(21) Appl. No.: 10/171,133

(22) Filed: Jun. 13, 2002

(65) Prior Publication Data

US 2003/0146766 A1 Aug. 7, 2003

Related U.S. Application Data

(60) Provisional application No. 60/355,622, filed on Feb. 5, 2002.

(51) Int. Cl.[7] .............................................. G11B 27/36
(52) U.S. Cl. ........................ 360/31; 360/75; 360/77.03; 360/78.11
(58) Field of Search ......................... 340/683; 324/210, 324/212, 226; 360/31, 75, 73.03, 77.02, 77.03, 78.04, 78.11, 77.06

(56) References Cited

U.S. PATENT DOCUMENTS

| | | |
|---|---|---|
| 5,036,235 A | 7/1991 | Kleckner |
| 5,162,955 A | 11/1992 | Burdenko |
| 5,328,271 A | 7/1994 | Titcomb |
| 5,357,163 A | 10/1994 | Minakuchi et al. |
| 5,594,595 A * | 1/1997 | Zhu .............................. 360/31 |
| 5,612,845 A | 3/1997 | Smith |
| 5,723,927 A | 3/1998 | Teshima |
| 5,880,587 A * | 3/1999 | Annis et al. ................. 324/212 |
| 5,897,494 A | 4/1999 | Flock et al. |
| 6,008,640 A * | 12/1999 | Tan et al. .................... 324/212 |

* cited by examiner

*Primary Examiner*—Alan T. Faber
(74) *Attorney, Agent, or Firm*—Westman, Champlin & Kelly (57) ABSTRACT

An apparatus and method of indirectly measuring half frequency whirl in a spindle motor having a rotor adapted to rotate a disc having a track which is followed by a transducer head that is actuated by a control system is provided. Vibration signals produced at the transducer head while the transducer head follows the track are detected. The half frequency whirl is determined as a function of the detected vibration signals.

20 Claims, 8 Drawing Sheets

FIG. 4

METHOD AND APPARATUS FOR MEASURING HALF FREQUENCY WHIRL IN A SPINDLE MOTOR

CROSS-REFERENCE TO RELATED APPLICATION

This application claims priority from U.S. Provisional Application 60/355,622 filed on Feb. 5, 2002 for inventors Xiong Liu, ChoonKiat Lim, YongJie Tang and Pow-Hing Yong and entitled "METHOD AND APPARATUS FOR MEASURING FDB MOTOR HALF FREQUENCY WHIRL."

FIELD OF THE INVENTION

The present invention relates to spindle motors used in applications such as disc drive data storage systems. In particular, the present invention relates to measuring half frequency whirl vibrations that occur in spindle motors.

BACKGROUND OF THE INVENTION

Spindle motors are commonly used in various applications wherein a precise rotating movement is required. These applications include disc drive data storage systems and their test apparatus (spin-stands). These disc drives and spin-stand testers usually incorporate one or more discs mounted for rotation on a rotor of the spindle motor. Data is recorded and read from a plurality of concentric tracks on the discs by an array of read/write heads. The heads are typically moved radially from track to track on the disc by an actuator assembly.

Advances in disc drive technology have revolved around reducing the size of disc drive components and the size of the overall disc drive. Smaller disc drives can allow for a reduction in overall size of computer systems into which disc drives are installed. With the reduction in size of the disc drive, more space is available within the computer system for other components. In addition to small disc drives, the disc drive industry has also made advances toward increasing the storage capacity of individual disc drive units.

The reduction in size of the disc drive can compound certain problems often associated with various operational features of disc drives. It also places greater performance demands on spin-stands used to test various components of the drive. One such problem involves vibrations or harmonic oscillations in the disc drive and spin-stand tester. The effect of vibrations and oscillations has become magnified as the size of the drive is reduced and data tracks are spaced closer together. As a result, the overall performance of the drive and spin-stand are negatively impacted.

One source of vibration in a disc drive and a spin-stand is from the spindle motors that they employ. These spindle motors typically include a stator comprising a core having windings arranged thereabout and a rotor shaft. Bearings support the rotor shaft in the radial and axial directions, the bearings being lubricated by a fluid. Large amplitude vibration can be caused by imbalance, rotor shaft flexibility, bearing flexibility, fluid film forces in the bearings as the shaft rotates, etc. One particularly common vibration mode occurs at approximately half the shaft rotation frequency. This vibration mode is called half frequency whirl. This half frequency whirl phenomenon is especially prominent in motors that use fluid dynamic bearings. Obtaining precise measurements of half frequency whirl is useful for design verification, quality assurance and failure analysis of spindle motors and disc drives and spin-stand testers which include these motors.

Various direct and indirect measurement techniques have been employed to determine half frequency whirl in a spindle motor. One direct measurement technique used to determine half frequency whirl includes placing a capacitance probe near the outer surface of the rotor shaft of the spindle motor to measure changes in position of the shaft while it rotates. These position measurements from the capacitance probe are fed to a spectrum analyzer that computes a frequency spectrum of the position measurements. The magnitude of the half frequency whirl is obtained from the frequency spectrum. Since the outer surface of the rotor shaft is not perfectly smooth and the resolution of a capacitance probe is relatively low, the half frequency whirl determined from such measurements is imprecise.

One indirect measurement technique for determining half frequency whirl includes utilizing proximity displacement probes to measure the radial motion of an edge of a disc that is mounted on the rotor shaft of the spindle motor instead of directly measuring rotor shaft motion. The half frequency whirl is determined as a function of these measurements. However, due to disc manufacturing and assembling errors, such as imperfection in disc roundness and misalignment between the disc and the rotor shaft, the half frequency whirl determined from such measurements is inaccurate. Other current direct and indirect half frequency whirl measurement techniques have similar disadvantages.

Embodiments of the present invention provide solutions to these and other problems, and offer other advantages over the prior art.

SUMMARY OF THE INVENTION

An apparatus and method of indirectly measuring half frequency whirl in a spindle motor having a rotor adapted to rotate a disc having a track which is followed by a transducer head that is actuated by a control system is provided. Vibration signals produced at the transducer head while the transducer head follows the track are detected. The half frequency whirl is determined as a function of the detected vibration signals.

Other features and benefits that characterize embodiments of the present invention will be apparent upon reading the following detailed description and review of the associated drawings.

BRIEF DESCRIPTION OF THE DRAWINGS

FIG. 1—1 is a block diagram showing an apparatus for indirectly measuring half frequency whirl in a spindle motor in accordance with the present invention.

FIG. 1-2 illustrates a top view of the actuator and the disc shown in the block diagram of FIG. 1-1.

FIG. 2-1 is a perspective view of a disc drive and a half frequency whirl measurement apparatus.

FIG. 2-2 is a block diagram of a servo loop of the disc drive of FIG. 2-1.

FIG. 2-3 is a plot of a the sensitivity function of the servo loop of FIG. 2-2.

FIGS. 2-4 and 2-5 illustrate a comparison between frequency spectrums obtained using a prior art rotor vibration measurement technique and a rotor vibration measurement technique of the present invention.

DETAILED DESCRIPTION OF ILLUSTRATIVE EMBODIMENTS

Figure 11:
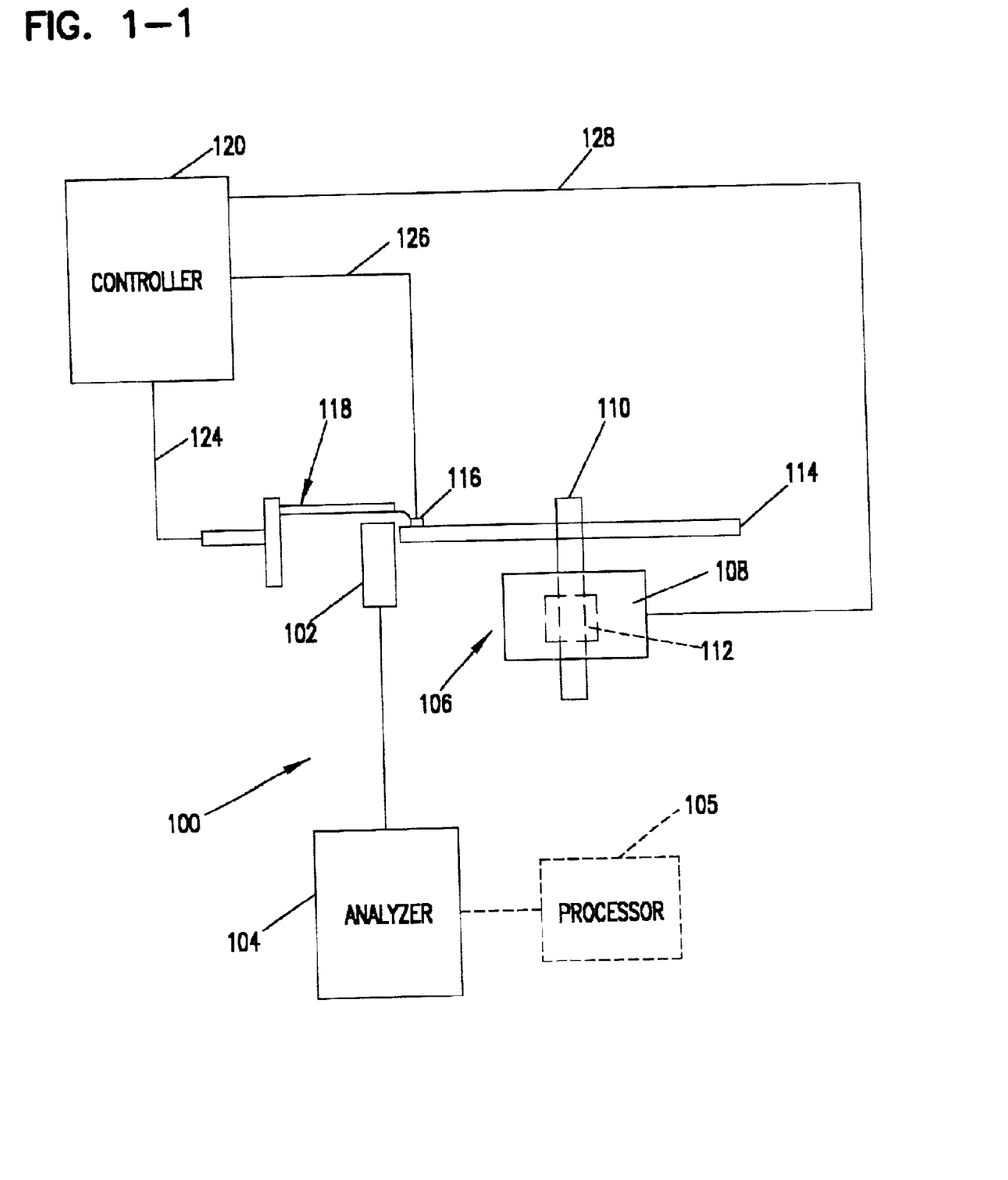

Referring now to FIG. 1-1, an apparatus 100 for indirectly measuring half frequency whirl in a spindle motor 106 is shown. The same reference numerals are used in various figures to represent the same or similar elements. Spindle motor 106 includes a stator 108, which includes a core having windings arranged thereabout, and a rotor shaft 110. Spindle motor 106 also includes bearings 112 that support rotor shaft 110 in radial and axial directions. Bearings 112 are typically lubricated by a fluid.

Figure 12:
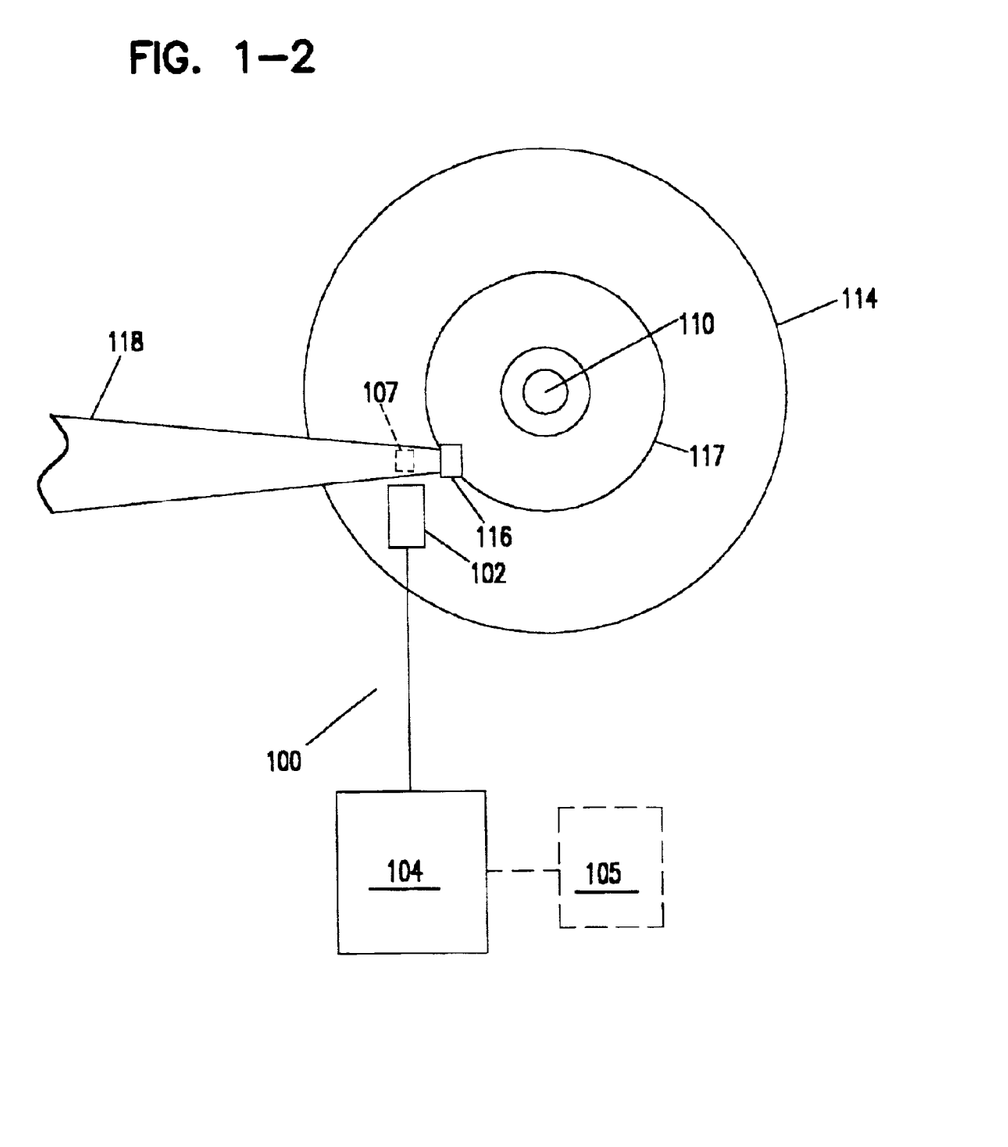

A disc 114, mounted about rotor shaft 110, has a disc surface that includes at least one track such as 117 (shown in FIG. 1-2). A transducer head included in a slider 116, which is supported by an actuator 118, communicates with the disc surface. A controller 120 provides actuation signals, via control line 124, to actuator 118 for positioning slider 116 over a desired track such as 117. Positioning of slider 116 over track 117 is typically carried out by a closed-loop servo control technique. Communication between controller 120 and head 116 takes place via control line 126. The operation of spindle motor 106 is controlled by signals provided by controller 120 via control line 128.

Energization of spindle motor 106 causes shaft 110 and disc 114 to rotate. Usually, when disc 114 rotates, head 116 flies above disc 114 on thin films of air or liquid that carry head 116 for communicating with the disc surface. Instead of flying above disc 114, head 116 may remain in contact with the disc surface when disc 114 rotates. As mentioned above, shaft 110 vibrates as it rotates, and one particularly common vibration mode, referred to as half frequency whirl, occurs at approximately half the rotation frequency of shaft 110. This half frequency whirl vibration in spindle motor 106 causes radial motion of disc 114 that is equal in magnitude and phase to the half frequency whirl. Additionally, when head 116, supported by actuator 118, follows a track such as 117, actuator movement equal in magnitude and phase to the half frequency whirl takes place in order to maintain proper position of head 116 over track 117 when disc 114 is radially displaced due to half frequency whirl vibrations in spindle motor 106.

Under the present invention, measurement apparatus 100 detects vibration signals produced at transducer head 116 while transducer head 116 follows track 117 and determines the half frequency whirl as a function of the detected vibration signals. Measurement apparatus 100 includes a vibration sensor 102 that detects vibration signals produced at transducer head 116. Further, apparatus 100 includes an analyzer 104, coupled to vibration sensor 102, which provides an output that includes the half frequency whirl magnitude. Analyzer 104 is preferably a spectrum analyzer that can provide a frequency spectrum of vibrations detected by sensor 102. Since the frequency of rotation of the spindle motor is typically known, the magnitude of vibration that corresponds to half the frequency of rotation of the spindle motor (half frequency whirl magnitude) can be simply read from the frequency spectrum. In some embodiments, a processor 105 is coupled to analyzer 104 to determine the half frequency whirl magnitude from the frequency spectrum. Further, processor 105 can compare the determined half frequency whirl magnitude with a threshold half frequency whirl magnitude and output information indicating whether the determined half frequency whirl magnitude corresponding to the spindle motor under test is above or below the threshold half frequency whirl magnitude. Such a comparison between a measured and threshold value of half frequency whirl is useful for design verification, quality assurance and failure analysis of spindle motors.

Vibration sensor 102 may be either coupled to or positioned near slider 116 or actuator 118. Preferably vibration sensor 102 is a non-contact sensor that may by positioned near either slider 116 or actuator 118. In some embodiments, vibration sensor 102 is a non-contact vibrometer, such as a Laser Doppler Vibrometer (LDV), which in general senses vibration by detecting variations in patterns of reflected waves from a vibrating object. A wave source such as a laser delivers wave radiation to the object whose vibration is to be measured. The surface of the object reflects the wave radiation as a speckle interference pattern which is detected by a detector, such as a photodetector. As the object vibrates, the speckle interference pattern moves. The variation in the speckle interference pattern across the detector carries amplitude and frequency information regarding the vibrating object. In some embodiments of the present invention, vibration sensor 102 is a non-contact vibrometer that delivers wave radiation to a mirror 107 (FIG. 1-2), which is mounted on actuator 118 to provide better reflection of waves. More accurate measurements from vibration sensor 102 are obtained when mirror 107 is employed to reflect the waves. In some embodiments of the present invention, vibration sensor 102 is a non-contact vibrometer which may be located at a distance of more than 10 centimeters from the vibrating object such as actuator 118.

Figure 21:
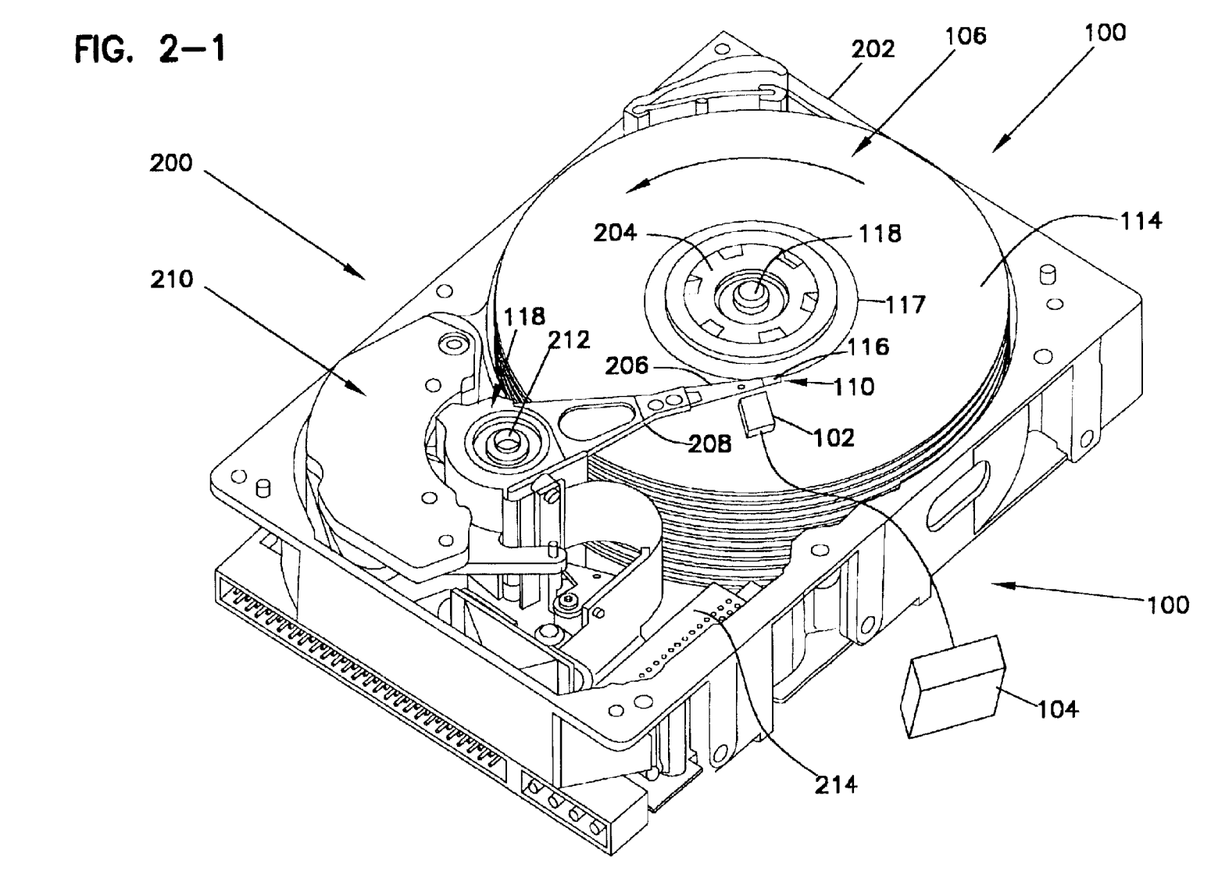

Referring now to FIG. 2-1, a perspective view of a disc drive 200 and a vibration measurement apparatus 100 of the present invention are shown. Disc drive 200 includes a housing with a base 202 and a top cover (not shown). Disc drive 200 further includes a disc pack 114, which is mounted on a rotor shaft 106 of a spindle motor by a disc clamp 204. Disc pack 114 includes a plurality of individual discs. Each disc surface has an associated disc head slider 116 which is mounted to disc drive 200 for communication with the disc surface. In the example shown in FIG. 1, sliders 116 are supported by suspensions 206 which are in turn attached to track accessing arms 208. Suspensions 206 and track accessing arms 208 are part of an actuator 118. The actuator shown in FIG. 1 is of the type known as a rotary moving coil actuator and includes a voice coil motor (VCM), shown generally at 210. Voice coil motor 210 rotates track accessing arms 208 with attached suspensions 206 and heads 116 about a pivot shaft 212 to position heads 116 over a desired data track such as 117. Voice coil motor 210 is driven by servo electronics 214 based on signals generated by heads 116 and a host computer (not shown). Vibration measurement apparatus 100 is employed to determine half frequency whirl of the spindle motor included in disc drive 200 as described below in connection with FIGS. 2-2, 2-3 and 2-5.

Figure 22:
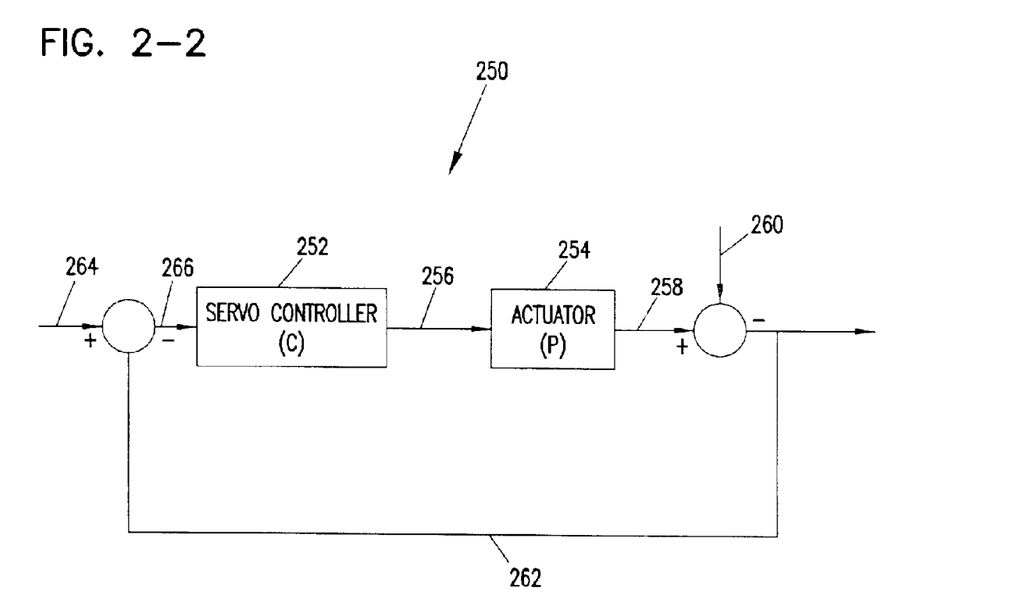

Referring now to FIG. 2-2, a block diagram of a servo loop 250 in disc drive 200 is shown. Servo loop 250 includes a servo controller 252 having a gain C and disc drive actuator mechanics 254 having a gain P. Servo controller 252 is the servo controller circuitry within internal circuit 214 of FIG. 2-1. Drive actuator mechanics 254 includes actuator assembly 118 and sliders 116 of FIG. 2-1.

Servo controller 252 generates a control signal 256 that drives the actuator mechanics 254. In response, actuator mechanics 254 produces head motion, y, represented by reference numeral 258. Head motion y is measured by vibration sensor 102. The difference between head motion y and the rotor shaft motion or disc motion, d, represented by reference numeral 260, results in the head's servo measurement signal 262. Servo measurement signal 262 is subtracted from reference signal 264 to produce a position error signal (PES) 266, which is input to servo controller 252.

Figure 23:
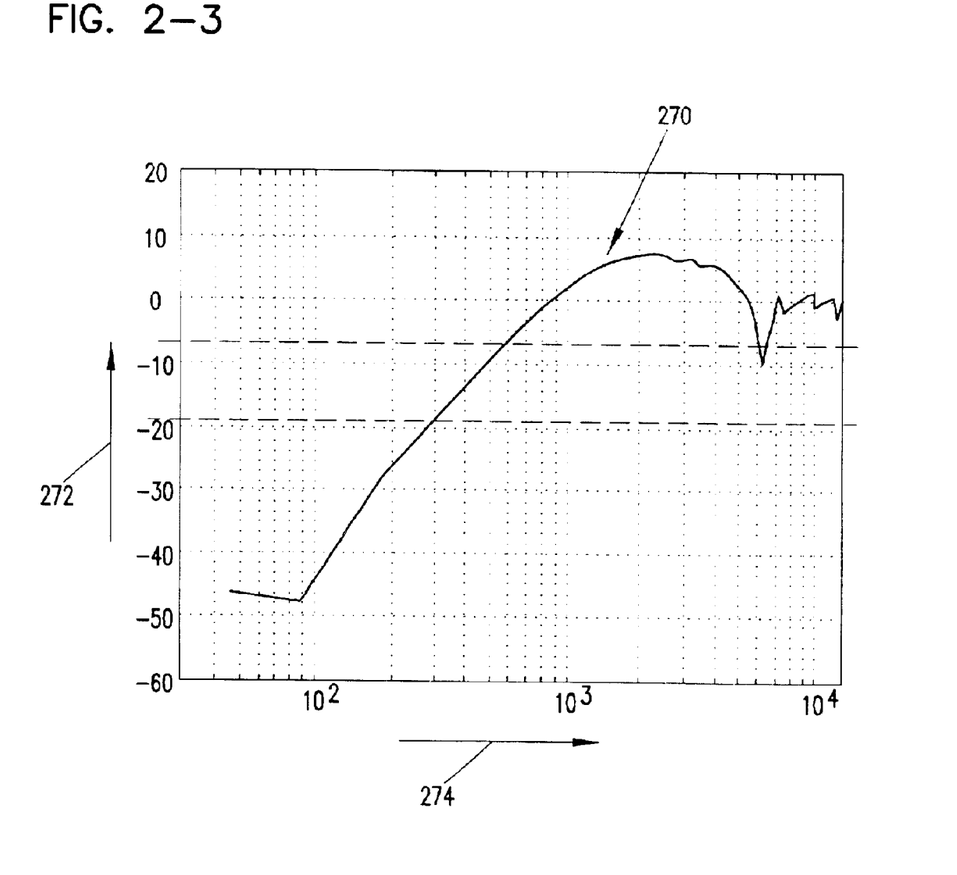

In servo loop 250 of FIG. 2-2, the relationship between head or actuator motion y and rotor shaft or disc vibration d is $$y = d\frac{PC}{1+PC}$$ Equation 1 or $$d = y\frac{1+PC}{PC}$$

where $$\frac{1}{1+PC}$$

is the sensitivity function of servo loop 250. FIG. 2-3 is a plot 270 of the sensitivity function with vertical axis 272 representing gain in decibels (dB) and horizontal axis 274 representing frequency in Hertz (Hz). As can be seen in FIG. 2-3, the sensitivity function at low frequencies is less than −40 dB. Half the frequency of rotation of shaft 110 falls within this low frequency range. When the sensitivity function value is less than −40 dB, |PC| is greater than 100. Thus, at low frequencies $$\approx d$$ Equation 2

This demonstrates that accurate measurements of half frequency whirl in a disc drive spindle motor can be obtained by measuring actuator motion y. Measurement of half frequency whirl in the spindle motor of disc drive 200 is carried out using vibration measurement apparatus 100 when disc drive 200 is energized and while actuator 118 is following track 117 under the control of servo electronics 214. The half frequency whirl measurements are obtained in a manner substantially similar to that described above in connection with spindle motor 106 of FIG. 1-1.

Figure 24:
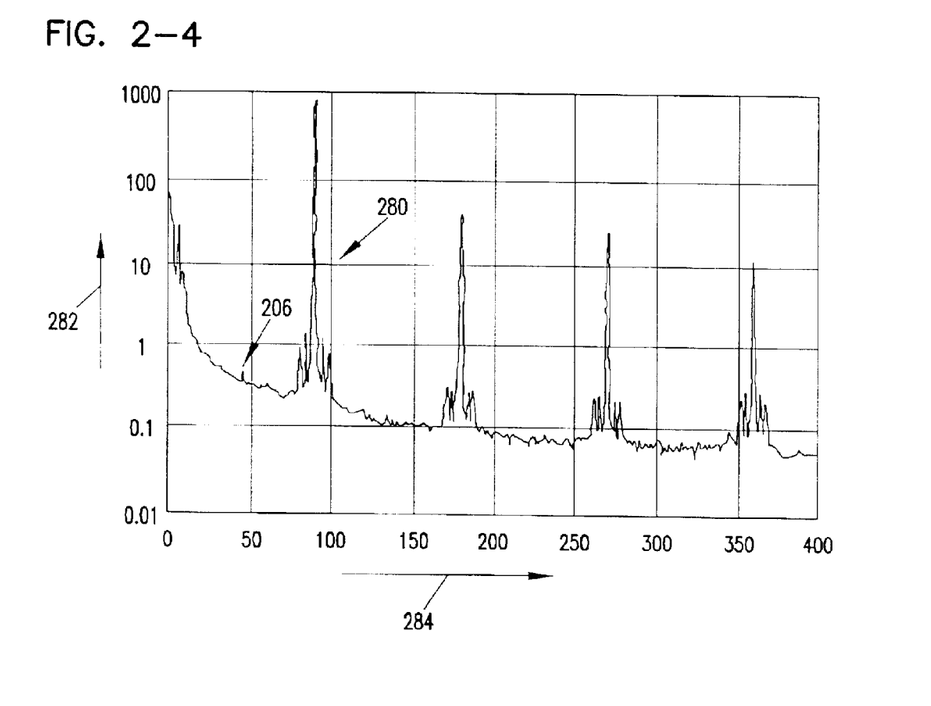

FIG. 2-4 is a frequency spectrum 280 obtained as a result of utilizing proximity displacement probes to measure radial motion at the outer diameter or edge of discs 114 of disc drive 200. Frequency spectrum 280 shows variation of vibration amplitude 282 in micro inches ($\mu$ inches) as a function of frequency 284 in Hz. Half frequency whirl vibration is shown approximately at region 206 in frequency spectrum 280. As mentioned above, due to disc manufacturing and assembling errors, such as imperfection in disc roundness and misalignment between the disc and the rotor shaft, the proximity displacement probes sense additional low frequency vibrations that do not emanate from the spindle motor. Due to these additional vibrations detected at the edges of the discs, the half frequency whirl amplitude is not clear from frequency spectrum 280 obtained using this prior art technique.

Figure 25:
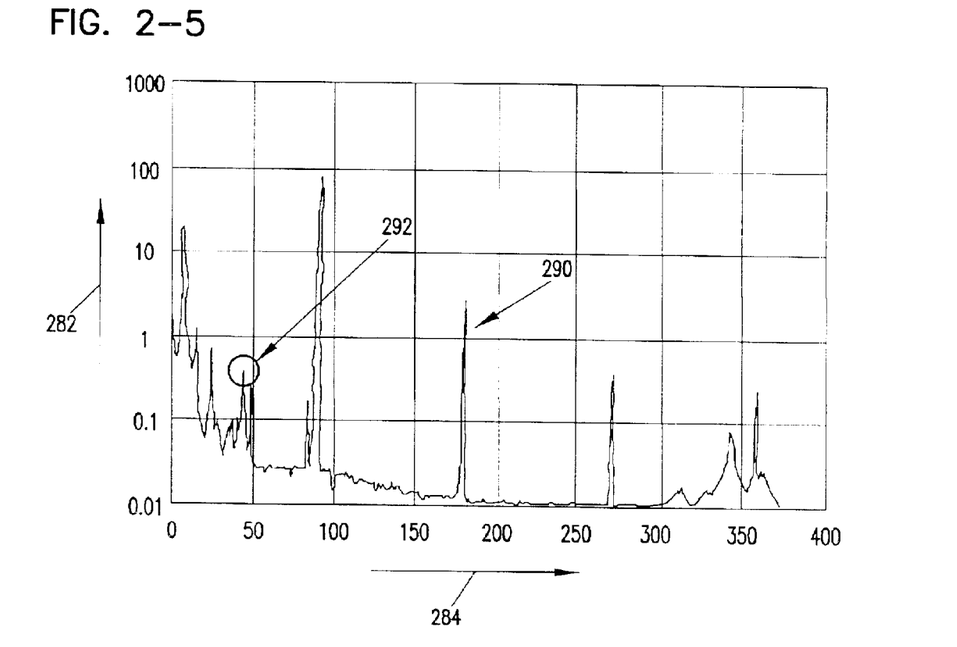

FIG. 2-5 is a frequency spectrum 290 obtained by utilizing vibration measurement apparatus 100 of the present invention and positioning vibration sensor 102 of apparatus 100 at transducer head 116 of disc drive 200 while it follows track 117. In spectrum 290, the half frequency whirl is shown clearly at region 292. The clarity of the half frequency whirl amplitude 292 is because the additional vibrations mentioned above are absent at transducer head 110 and therefore do not appear on frequency spectrum 290.

Figure 3:
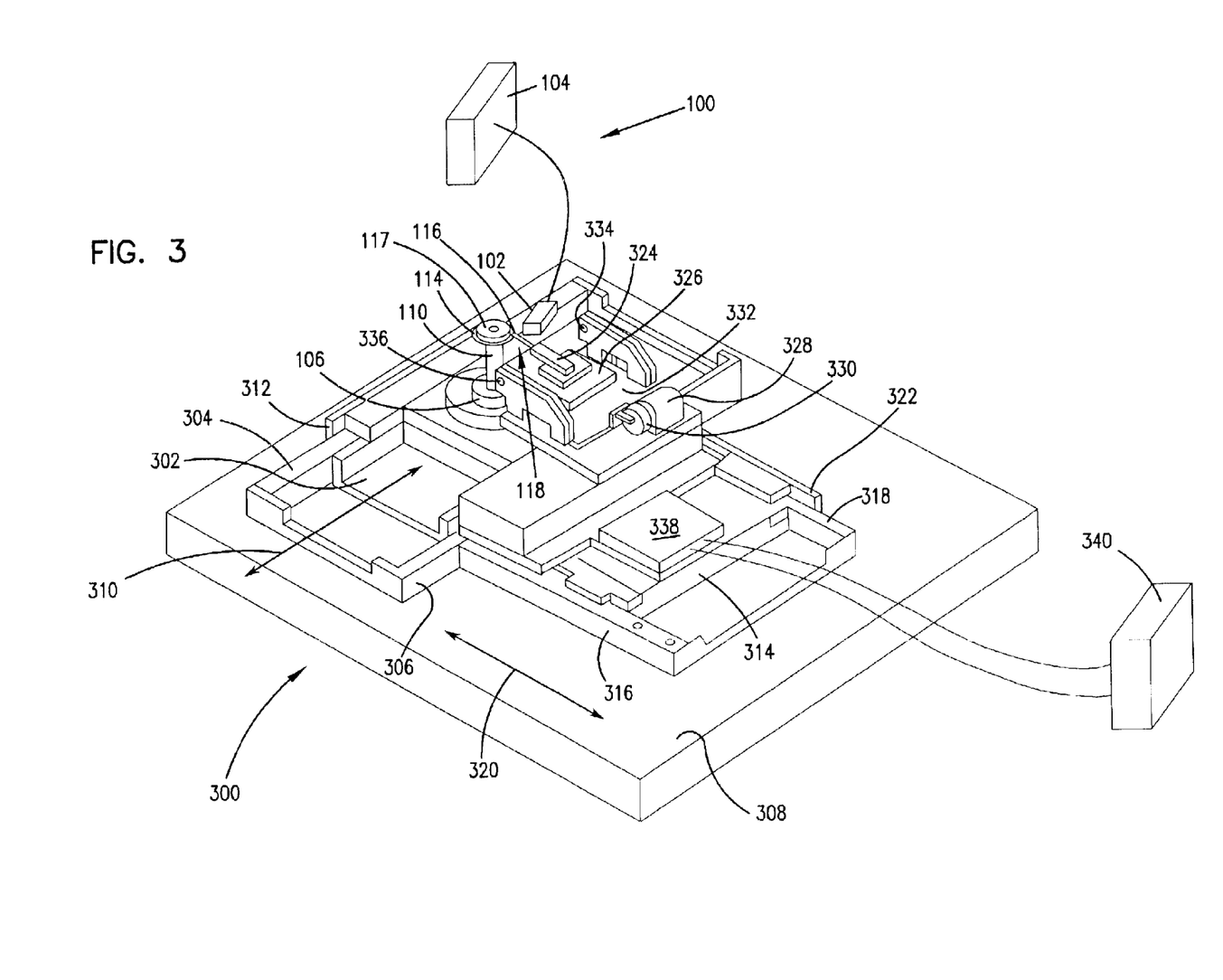
FIG. 3 is a perspective view of a spin-stand tester and a half frequency whirl measurement apparatus.

Referring now to FIG. 3, a perspective view of a spinstand 300 and a vibration measurement apparatus 100 of the present invention are shown. Spin-stand 300 includes a disc 114 which is mounted on spindle or shaft 110 of a spindle motor 106. Spindle motor 106 rests on platform 302 which moves between guide rails 304 and 306. Platform 302 can be supported by a cushion of air during movement and can be stabilized in a particular position by the application of a vacuum between platform 302 and granite base 308 located directly below platform 302. For purposes of reference, movement of platform 302 along guide rails 304 and 306 is considered to be in the "X" direction as shown by arrows 310. A position encoder 312 can be located, for example, along guide 304 to provide an indication of the position of platform 302.

Spin-stand 300 also includes a carriage 314 that moves between rails 316 and 318 in the "Y" direction as indicated by arrows 320. Similar to platform 302, carriage 314 can be supported by a cushion of air during movement and can be locked into position by applying a vacuum between carriage 314 and granite base 308. A position encoder 322 can be located, for example, along guide 318 to provide an indication of the position of carriage 314.

Carriage 314 and platform 302 both move using electromotive motors mounted between one of the guide rails and the respective platform or carriage. Other types of motors, such as a stepper motor, may be used in place of the electromotive motors. These motors generally perform coarse adjustment of a suspension or actuator assembly 118, which is connected to a suspension chuck 324 and supports a transducing head 116 proximate a surface of disc 114. In one embodiment, suspension chuck 324 is connected to piezo platform 326 through piezo elements that are able to move suspension chuck 324, generally in the "X" direction 310, to perform fine adjustment of transducing head 116 relative to disc 114.

During head loading operations, pivot motor 328 rotates eccentric 20 cam 330 causing the back end of pivoting platform 332 to rotate upward about pivot pins 334 and 336. Carriage 314 can be moved forward so that transducing head 116, carried at the end of suspension or actuator assembly 118, moves under the spinning disc 114. Support platform 302 is also moved so that the head 116 is positioned at a desired radius along disc 114. When head 116 nears the desired location relative to disc 114, motor 328 rotates eccentric cam 330 back so that pivoting platform 166 returns to its level position and the head is brought into proximity with disc 114 so that head 116 can fly over the surface of disc 114.

Head 116 on suspension or actuator assembly 118 is connected by electrical leads to printed circuit 338, which has further connections to control box 340. Control circuitry, which is either part of circuit 338 or contained in control box 340, is used to control the positioning of head 116 on suspension assembly 118. The control circuitry for spinstand 300 can move head 116 to a test track 117 on disc 116 which data is to be read from or written to. Additionally, the position of head 116 can be adjusted by the control circuitry to move head 116 to a number of different locations within the test track during readback, so that a profile of head 114 can be determined. Closed loop servo control techniques can be employed to position head 116 over track 117 during track following. Measurement of half frequency whirl in the spindle motor of spin stand 300 is carried out using vibration measurement apparatus 100 in a manner substantially similar to that described above in connection with spindle motor 106 of FIG. 1-1.

Figure 4:
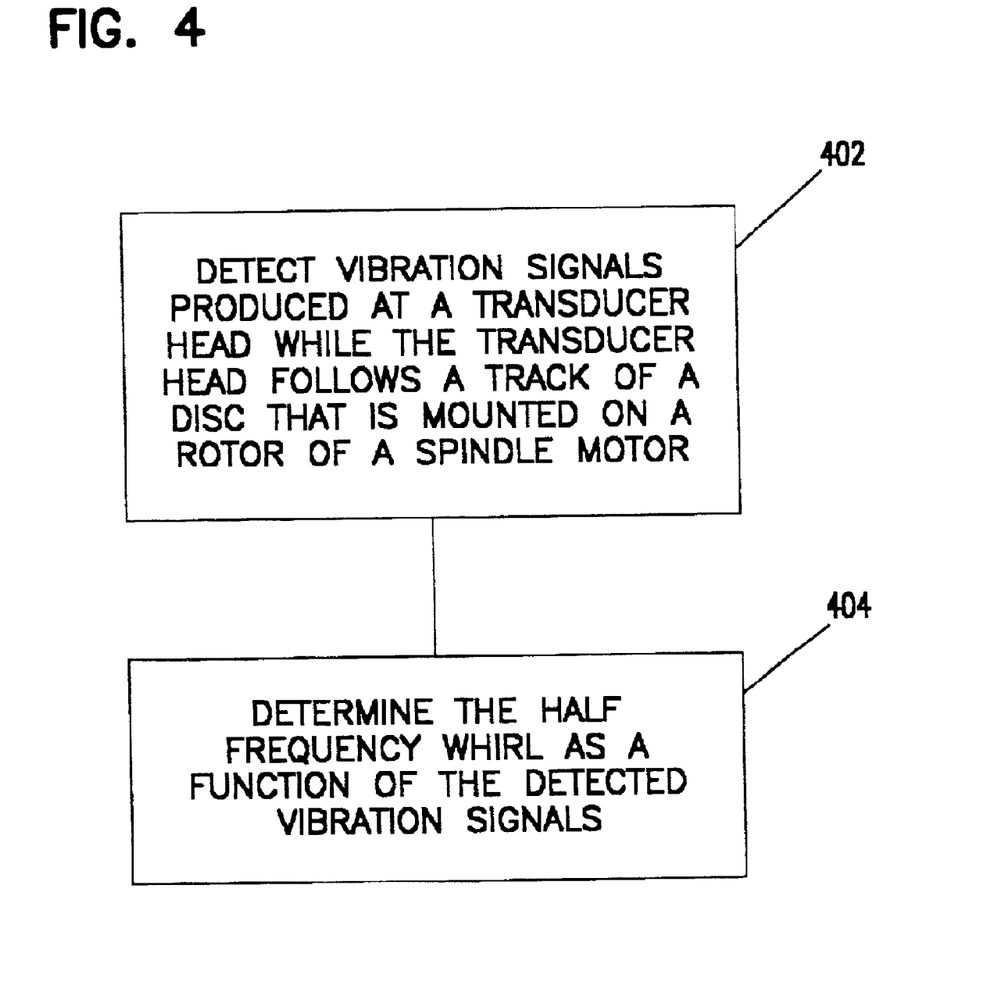
FIG. 4 is a flow chart representing a method of indirectly measuring half frequency whirl in a spindle motor in accordance with an illustrative embodiment of the present invention.

FIG. 4 is a flow chart representing a method of indirectly measuring half frequency whirl in a spindle motor in accordance with an illustrative embodiment of the present invention. The spindle motor includes a rotor that can rotate a disc that includes a track. A transducer head, which is actuated by a control system, can follow the track when the rotor and disc rotate. At step 402, vibration signals produced at the transducer head while the transducer head follows the track are detected. At step 404, the half frequency whirl is determined as a function of the detected vibration signals. Different techniques, some of which are set forth above, can be employed to carry out the steps shown in the flow chart of FIG. 4 while maintaining substantially the same functionality without department from the scope and spirit of the present invention.

In summary, a method of indirectly measuring half frequency whirl in a spindle motor (such as 106) having a rotor (such as 110) adapted to rotate a disc (such as 114) having a track (such as 117) which is followed by a transducer head (such as 116) that is actuated by a control system is provided. Vibration signals produced at the transducer head (such as 116) while the transducer head (such as 116) follows the track (such as 117) are detected. The half frequency whirl is determined as a function of the detected vibration signals.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the spindle motor while maintaining substantially the same functionality without departing from the scope and spirit of the present invention. In addition, although the preferred embodiment described herein is directed to a spindle motor for disc drives and spin-stand testers, it will be appreciated by those skilled in the art that the teachings of the present invention can be applied to other systems that employ spindle motors, without departing from the scope and spirit of the present invention.

What is claimed is:

1. A method of indirectly measuring half frequency whirl in a spindle motor having a rotor adapted to rotate a disc having a track which is followed by a transducer head that is actuated by a control system, the method comprising:
   (a) detecting vibration signals produced at the transducer head while the transducer head follows the track; and
   (b) determining the half frequency whirl as a function of the detected vibration signals.

2. The method of claim 1 wherein the detecting vibration signals step (a) is carried out using a non-contact vibration sensing technique.

3. The method of claim 2 wherein using the non-contact vibration sensing technique includes focusing a laser beam on an actuator that supports the transducer head, and measuring a reflection of the laser beam from the actuator.

4. The method of claim 3 wherein the laser beam is focused on a mirror mounted on the actuator.

5. The method of claim 2 wherein a Laser Doppler Vibrometer is employed to implement the non-contact vibration sensing technique.

6. The method of claim 1 wherein the determining the half frequency whirl step (b) comprises obtaining a frequency spectrum of the detected vibration signals.

7. The method of claim 6 wherein the frequency spectrum of the detected vibration signals is obtained by utilizing a spectrum analyzer.

8. The method of claim 1 wherein the spindle motor is a part of a disc drive storage system and wherein the method is carried out with the spindle motor installed in the disc drive storage system.

9. The method of claim 1 wherein the spindle motor is a part of a disc drive tester and wherein the method is carried out with the spindle motor installed in the disc drive tester.

10. The method of claim 1 further comprising (c) comparing the determined half frequency whirl with a threshold half frequency whirl value.

11. A apparatus for indirectly measuring half frequency whirl in a spindle motor having a rotor adapted to rotate a disc having a track which is followed by a transducer head that is actuated by a control system, the apparatus comprising:
   a vibration sensor configured to detect vibration signals produced at the transducer head while the transducer head follows the track; and
   an analyzer configured to determine the half frequency whirl as a function of the detected vibration signals.

12. The apparatus of claim 11 wherein the vibration sensor is a non-contact vibration sensor.

13. The apparatus of claim 12 wherein the non-contact vibration sensor is configured to focus a laser beam on an actuator that supports the transducer head, and to measure a reflection of the laser beam from the actuator.

14. The apparatus of claim 13 wherein the non-contact vibration sensor is configured to focus the laser beam on a mirror mounted on the actuator.

15. The apparatus of claim 12 wherein the vibration sensor is a Laser Doppler Vibrometer.

16. The apparatus of claim 11 wherein the analyzer is a spectrum analyzer configured to obtain a frequency spectrum of the detected vibration signals.

17. The apparatus of claim 11 wherein the spindle motor is a part of a disc drive storage system.

18. The apparatus of claim 11 wherein the spindle motor is a part of a disc drive tester.

19. The apparatus of claim 11 further comprising a processor configured to compare the determined half frequency whirl with a threshold half frequency whirl value.

20. A apparatus for indirectly measuring half frequency whirl in a spindle motor having a rotor adapted to rotate a disc having a track which is followed by a transducer head that is actuated by a control system, the apparatus comprising:
   a vibration sensor configured to detect vibration signals produced at the transducer head while the transducer head follows the track; and
   means for determining the half frequency whirl as a function of the detected vibration signals.

* * * * *